United States Patent
Austin et al.

(10) Patent No.: US 10,633,565 B2
(45) Date of Patent: Apr. 28, 2020

(54) PROPYLENE-BASED POLYMERS AND PLASTICIZERS FOR USE IN ADHESIVE COMPOSITIONS

(71) Applicant: ExxonMobil Chemical Patents Inc., Baytown, TX (US)

(72) Inventors: Jennifer J. Austin, The Woodlands, TX (US); Jurgen J. M. Schroeyers, Bierbeek Opvelp (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/148,817

(22) Filed: May 6, 2016

(65) Prior Publication Data

US 2016/0376478 A1    Dec. 29, 2016

Related U.S. Application Data

(60) Provisional application No. 62/183,918, filed on Jun. 24, 2015.

(51) Int. Cl.

| | | |
|---|---|---|
| C09J 123/14 | (2006.01) | |
| C09J 123/12 | (2006.01) | |
| C09J 123/10 | (2006.01) | |
| C08L 23/12 | (2006.01) | |
| C08L 91/00 | (2006.01) | |
| C08L 23/10 | (2006.01) | |

(52) U.S. Cl.
CPC ............ *C09J 123/12* (2013.01); *C08L 23/10* (2013.01); *C08L 23/12* (2013.01); *C08L 91/005* (2013.01); *C09J 123/10* (2013.01); *C09J 123/14* (2013.01); *C09J 123/142* (2013.01); *C08L 2205/025* (2013.01)

(58) Field of Classification Search
None
See application file for complete search history.

(56) References Cited

U.S. PATENT DOCUMENTS

| | | | |
|---|---|---|---|
| 6,197,887 B1 * | 3/2001 | Somers | C08J 5/18 |
| | | | 525/240 |
| 6,881,800 B2 | 4/2005 | Friedersdorf | |
| 7,294,681 B2 | 11/2007 | Jiang et al. | |
| 7,524,910 B2 | 4/2009 | Jiang et al. | |
| 2004/0081795 A1 * | 4/2004 | Wang | C09J 123/142 |
| | | | 428/114 |
| 2004/0236042 A1 | 11/2004 | Datta et al. | |
| 2012/0329353 A1 * | 12/2012 | Davis | C09J 123/10 |
| | | | 442/381 |
| 2013/0130027 A1 * | 5/2013 | Curry | C09J 4/06 |
| | | | 428/355 EN |
| 2013/0225752 A1 * | 8/2013 | Tse | C08L 23/10 |
| | | | 524/505 |

FOREIGN PATENT DOCUMENTS

WO    2013/134038    9/2013

OTHER PUBLICATIONS

Cheng, "$^{13}C$ NMR Analysis of Ethylene-Propylene Rubbers", Macaromolecules, vol. 17, pp. 1950-1955 (1984).
Sun et al., *Effect of Short Chain Branching on the Coil Dimensions of Polyolefins in Dilute Solution:*, Macromolecules 2001, vol. 34, pp. 6812-6820.

* cited by examiner

*Primary Examiner* — David J Buttner

(57) ABSTRACT

The present invention is related to an adhesive composition comprising a 30-80 wt % polymer blend and 2 to about 20 wt % of an oil. The blend has a first and second propylene-based polymer, both different homopolymers of propylene or a copolymer of propylene and ethylene or a $C_4$ to $C_{10}$ alpha-olefin.

9 Claims, No Drawings

PROPYLENE-BASED POLYMERS AND PLASTICIZERS FOR USE IN ADHESIVE COMPOSITIONS

CROSS REFERENCE TO RELATED APPLICATIONS

This application claims the benefit of and priority to U.S. Ser. No. 62/183,918, filed Jun. 24, 2015, the disclosure of which is incorporated by reference in its entirety.

FIELD OF INVENTION

The invention relates to plasticizers/oils for polyolefin adhesive compositions for use in hygiene applications.

BACKGROUND

Adhesive composition components such as base polymers, tackifiers, waxes, and oils are customarily provided as separate components for formulation into hot melt adhesive (HMA) compositions. In HMA nonwoven and hygiene applications, adhesive compositions are sought that provide a desired combination of physical properties, such as low viscosity to enable easy processability of said formulations and high peel strength over time to provide stable adhesion.

Exemplary base polymer compositions and methods of making polymer compositions for HMA applications that can be used for nonwoven and hygiene applications are disclosed in U.S. Pat. Nos. 7,294,681 and 7,524,910. Various polymers described in these patents and/or produced by the methods disclosed in these patents have been sold by ExxonMobil Chemical Company as LINXAR™ polymers.

International Publication No. 2013/134038 discloses a method for producing a polymer blend having at least two different propylene-based polymers produced in parallel reactors. The multi-modal polymer blend has a Mw of about 10,000 g/mol to about 150,000 g/mol. Many different types of polymers and additives are known and have been used in HMA formulations for nonwoven applications. Generally, adhesive formulations for these applications are prepared by combining polymer, tackifier, and wax in equal quantities. However, there remains a need for an adhesive formulation that has the new base polymer combined with one or more oils that has suitable adhesive properties over time.

SUMMARY

In one aspect, the present invention relates to an adhesive composition comprising (a) a polymer blend comprising a first propylene-based polymer, wherein the first propylene-based polymer is a homopolymer of propylene or a copolymer of propylene and ethylene or a $C_4$ to $C_{10}$ alpha-olefin; a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer; wherein the polymer blend has a melt viscosity, measured at 190° C. of about 1,000 to about 30,000 cP and wherein the polymer blend is present in the amount of about 30 wt % to about 80 wt % of the adhesive composition; and (b) an oil selected from at least one of a white oil, naphthenic oil, polyalphaolefin, mineral oil, and combinations thereof, wherein the oil is present in the amount of about 2 wt % to about 20 wt % of the adhesive composition.

DETAILED DESCRIPTION

Various specific embodiments of the invention will now be described, including preferred embodiments and definitions that are adopted herein for purposes of understanding the claimed invention. While the illustrative embodiments have been described with particularity, it will be understood that various other modifications will be apparent to and can be readily made by those skilled in the art without departing from the spirit and scope of the invention. For determining infringement, the scope of the "invention" will refer to any one or more of the appended claims, including their equivalents and elements or limitations that are equivalent to those that are recited.

The inventors have discovered adhesive compositions utilizing one or more oils/plasticizers combined with a base polymer, such that the adhesive composition is suitable for nonwoven applications over a broad time period. Specifically, the inventors have unexpectedly discovered that a selection of oils can impart good adhesive strength in addition to providing improved processability.

The inventive adhesives may be produced using a new process platform that is more robust and lacks many of the limitations and difficulties associated with the processes employed to make LINXAR polymers and those disclosed in U.S. Pat. Nos. 7,294,681 and 7,524,910. Advantageously, about 50 wt % to about 95 wt % of one or more polymer blends is used in adhesive formulations when the polymer blend has a melt viscosity of about 1,000 cP to about 30,000 cP.

A. Methods of Preparing Polymer Blends and Compositions

A solution polymerization process for preparing polymer blends is generally performed by a system that includes a first reactor, a second reactor in parallel with the first reactor, a liquid-phase separator, a devolatilizing vessel, and a pelletizer. The first reactor and second reactor may be, for example, continuous stirred-tank reactors.

The first reactor may receive a first monomer feed, a second monomer feed, and a catalyst feed. The first reactor may also receive feeds of a solvent and an activator. The solvent and/or the activator feed may be combined with any of the first monomer feed, the second monomer feed, or catalyst feed or the solvent and activator may be supplied to the reactor in separate feed streams. A first polymer is produced in the first reactor and is evacuated from the first reactor via a first product stream. The first product stream comprises the first polymer, solvent, and any unreacted monomer.

In any embodiment, the first monomer in the first monomer feed may be propylene and the second monomer in the second monomer feed may be ethylene or a $C_4$ to $C_{10}$ olefin. In any embodiment, the second monomer may be ethylene, butene, hexene, and octene. Generally, the choice of monomers and relative amounts of chosen monomers employed in the process depends on the desired properties of the first polymer and final polymer blend. For adhesive compositions, ethylene and hexene are particularly preferred comonomers for copolymerization with propylene. In any embodiment, the relative amounts of propylene and comonomer supplied to the first reactor may be designed to produce a polymer that is predominantly propylene, i.e., a polymer that is more than 50 mol % propylene. In another embodiment, the first reactor may produce a homopolymer of propylene.

The second polymer is different than the first polymer. The difference may be measured, for example, by the comonomer content, heat of fusion, crystallinity, branching index, weight average molecular weight, and/or polydispersity of the two polymers. In any embodiment, the second polymer may comprise a different comonomer than the first polymer or one polymer may be a homopolymer of propylene and the other polymer may comprise a copolymer of propylene and ethylene or a $C_4$ to $C_{10}$ olefin. For example, the first polymer may comprise a propylene-ethylene copolymer and the second polymer may comprise a propylene-hexene copolymer. In any embodiment, the second polymer may have a different weight average molecular weight (Mw) than the first polymer and/or a different melt viscosity than the first polymer. Furthermore, in any embodiment, the second polymer may have a different crystallinity and/or heat of fusion than the first polymer.

It should be appreciated that any number of additional reactors may be employed to produce other polymers that may be integrated with (e.g., grafted) or blended with the first and second polymers. Further description of exemplary methods for polymerizing the polymers described herein may be found in U.S. Pat. No. 6,881,800, which is incorporated by reference herein.

The first product stream and second product stream may be combined to produce a blend stream. For example, the first product stream and second product stream may supply the first and second polymer to a mixing vessel, such as a mixing tank with an agitator.

The blend stream may be fed to a liquid-phase separation vessel to produce a polymer rich phase and a polymer lean phase. The polymer lean phase may comprise the solvent and be substantially free of polymer. At least a portion of the polymer lean phase may be evacuated from the liquid-phase separation vessel via a solvent recirculation stream. The solvent recirculation stream may further include unreacted monomer. At least a portion of the polymer rich phase may be evacuated from the liquid-phase separation vessel via a polymer rich stream.

In any embodiment, the liquid-phase separation vessel may operate on the principle of Lower Critical Solution Temperature (LCST) phase separation. This technique uses the thermodynamic principle of spinodal decomposition to generate two liquid phases; one substantially free of polymer and the other containing the dissolved polymer at a higher concentration than the single liquid feed to the liquid-phase separation vessel.

Employing a liquid-phase separation vessel that utilizes spinodal decomposition to achieve the formation of two liquid phases may be an effective method for separating solvent from multi-modal polymer blends, particularly in cases in which one of the polymers of the blend has a weight average molecular weight less than 100,000 g/mol, and even more particularly between 10,000 g/mol and 60,000 g/mol. The concentration of polymer in the polymer lean phase may be further reduced by catalyst selection.

Upon exiting the liquid-phase separation vessel, the polymer rich stream may then be fed to a devolatilizing vessel for further polymer recovery. In any embodiment, the polymer rich stream may also be fed to a low pressure separator before being fed to the inlet of the devolatilizing vessel. While in the vessel, the polymer composition may be subjected to a vacuum in the vessel such that at least a portion of the solvent is removed from the polymer composition and the temperature of the polymer composition is reduced, thereby forming a second polymer composition comprising the multi-modal polymer blend and having a lower solvent content and a lower temperature than the polymer composition as the polymer composition is introduced into the vessel. The polymer composition may then be discharged from the outlet of the vessel via a discharge stream.

The cooled discharge stream may then be fed to a pelletizer where the multi-modal polymer blend is then discharged through a pelletization die as formed pellets. Pelletization of the polymer may be by an underwater, hot face, strand, water ring, or other similar pelletizer. Preferably an underwater pelletizer is used, but other equivalent pelletizing units known to those skilled in the art may also be used. General techniques for underwater pelletizing are known to those of ordinary skill in the art.

Exemplary methods for producing useful polymer blends are further described in International Publication No. 2013/134038, which is incorporated herein in its entirety. In particular, the catalyst systems used for producing semi-crystalline polymers of the polymer blend may comprise a metallocene compound and activator such as those described in International Publication No. 2013/134038. Exemplary catalysts may include dimethylsilyl bis(2-methyl-4-phenylindenyl) zirconium dichloride, dimethylsilyl bis(2-methyl-5-phenylindenyl) hafnium dichloride, dimethylsilyl bis(2-methyl-4-phenylindenyl) zirconium dimethyl, and dimethylsilyl bis(2-methyl-4-phenylindenyl) hafnium dimethyl.

B. Polymers

As described herein, the polymer blend comprises a first propylene-based polymer and a second propylene-based polymer. Preferred first and/or second propylene-based polymers of the polymer blend are semi-crystalline propylene-based polymers. In any embodiment, the polymers may have a relatively low molecular weight, preferably about 150,000 g/mol or less. In any embodiment, the polymer may comprise a comonomer selected from the group consisting of ethylene and linear or branched $C_4$ to $C_{20}$ olefins and diolefins. In any embodiment, the comonomer may be ethylene or a $C_4$ to $C_{10}$ olefin.

The term "polymer" as used herein includes, but is not limited to, homopolymers, copolymers, interpolymers, terpolymers, etc. and alloys and blends thereof. Further, as used herein, the term "copolymer" is meant to include polymers having two or more monomers, optionally with other monomers, and may refer to interpolymers, terpolymers, etc. The term "polymer" as used herein also includes impact, block, graft, random and alternating copolymers. The term "polymer" shall further include all possible geometrical configurations unless otherwise specifically stated. Such configurations may include isotactic, syndiotactic and random symmetries. The term "polymer blend" as used herein includes, but is not limited to a blend of one or more polymers prepared in solution or by physical blending, such as melt blending.

"Propylene-based" as used herein, is meant to include any polymer comprising propylene, either alone or in combination with one or more comonomers, in which propylene is the major component (i.e., greater than 50 mol % propylene).

In any embodiment, one or more polymers of the polymer blend may comprise one or more propylene-based polymers, which comprise propylene and from about 2 mol % to about 30 mol % of one or more comonomers selected from $C_2$ and $C_4$-$C_{10}$ α-olefins. In any embodiment, the α-olefin comonomer units may derive from ethylene, butene, pentene, hexene, 4-methyl-1-pentene, octene, or decene. The embodiments described below are discussed with reference to ethylene and hexene as the α-olefin comonomer, but the embodiments are equally applicable to other copolymers with other α-olefin comonomers. In this regard, the copolymers may simply be referred to as propylene-based polymers with reference to ethylene or hexene as the α-olefin.

In any embodiment, the one or more propylene-based polymers of the polymer blend may include at least about 5 mol %, at least about 6 mol %, at least about 7 mol %, or at least about 8 mol %, or at least about 10 mol %, or at least about 12 mol % ethylene-derived or hexene-derived units. In those or other embodiments, the copolymers of the propylene-based polymer may include up to about 30 mol %, or up to about 25 mol %, or up to about 22 mol %, or up to about 20 mol %, or up to about 19 mol %, or up to about 18 mol %, or up to about 17 mol % ethylene-derived or hexene-derived units, where the percentage by mole is based upon the total moles of the propylene-derived and α-olefin derived units. Stated another way, the propylene-based polymer may include at least about 70 mol %, or at least about 75 mol %, or at least about 80 mol %, or at least about 81 mol % propylene-derived units, or at least about 82 mol % propylene-derived units, or at least about 83 mol % propylene-derived units; and in these or other embodiments, the copolymers of the propylene-based polymer may include up to about 95 mol %, or up to about 94 mol %, or up to about 93 mol %, or up to about 92 mol %, or up to about 90 mol %, or up to about 88 mol % propylene-derived units, where the percentage by mole is based upon the total moles of the propylene-derived and alpha-olefin derived units. In any embodiment, the propylene-based polymer may comprise from about 5 mol % to about 25 mol % ethylene-derived or hexene-derived units, or from about 8 mol % to about 20 mol % ethylene-derived or hexene-derived units, or from about 12 mol % to about 18 mol % ethylene-derived or hexene-derived units.

The one or more polymers of the blend of one or more embodiments are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

In any embodiment, the Tm of the one or more polymers of the blend (as determined by DSC) may be less than about 130° C., or less than about 125° C., less than about 120° C., or less than about 115° C., or less than about 110° C., or less than about 100° C., or less than about 90° C., and greater than about 70° C., or greater than about 75° C., or greater than about 80° C., or greater than about 85° C. In any embodiment, the Tm of the one or more polymers of the blend may be greater than about 25° C., or greater than about 30° C., or greater than about 35° C., or greater than about 40° C. Tm of the polymer blend can be determined by taking 5 to 10 mg of a sample of the polymer blend, equilibrating a DSC Standard Cell FC at −90° C., ramping the temperature at a rate of 10° C. per minute up to 200° C., maintaining the temperature for 5 minutes, lowering the temperature at a rate of 10° C. per minute to −90° C., ramping the temperature at a rate of 10° C. per minute up to 200° C., maintaining the temperature for 5 minutes, and recording the temperature as Tm.

In one or more embodiments, the crystallization temperature (Tc) of the polymer blend (as determined by DSC) is less than about 110° C., or less than about 90° C., or less than about 80° C., or less than about 70° C., or less than about 65° C. In the same or other embodiments, the Tc of the polymer is greater than about 25° C.

The polymers suitable for use herein are said to be "semi-crystalline", meaning that in general they have a relatively low crystallinity. The term "crystalline" as used herein broadly characterizes those polymers that possess a high degree of both inter and intra molecular order, and which preferably melt higher than 110° C., more preferably higher than 115° C., and most preferably above 130° C. A polymer possessing a high inter and intra molecular order is said to have a "high" level of crystallinity, while a polymer possessing a low inter and intra molecular order is said to have a "low" level of crystallinity. Crystallinity of a polymer can be expressed quantitatively, e.g., in terms of percent crystallinity, usually with respect to some reference or benchmark crystallinity. As used herein, crystallinity is measured with respect to isotactic polypropylene homopolymer. Preferably, heat of fusion is used to determine crystallinity. Thus, for example, assuming the heat of fusion for a highly crystalline polypropylene homopolymer is 190 J/g, a semi-crystalline propylene copolymer having a heat of fusion of 95 J/g will have a crystallinity of 50%. The term "crystallizable" as used herein refers to those polymers which can crystallize upon stretching or annealing. Thus, in certain specific embodiments, the semi-crystalline polymer may be crystallizable. The semi-crystalline polymers used in specific embodiments of this invention preferably have a crystallinity of from 2% to 65% of the crystallinity of isotatic polypropylene. In further embodiments, the semi-crystalline polymers may have a crystallinity of from about 3% to about 40%, or from about 4% to about 30%, or from about 5% to about 25% of the crystallinity of isotactic polypropylene.

The semi-crystalline polymer of the polymer blend can have a level of isotacticity expressed as percentage of isotactic triads (three consecutive propylene units), as measured by $^{13}C$ NMR, of 75 mol % or greater, 80 mol % or greater, 85 mol % or greater, 90 mol % or greater, 92 mol % or greater, 95 mol % or greater, or 97 mol % or greater. In one or more embodiments, the triad tacticity may range from about 75 mol % to about 99 mol %, or from about 80 mol % to about 99 mol %, or from about 85 mol % to about 99 mol %, or from about 90 mol % to about 99 mol %, or from about 90 mol % to about 97 mol %, or from about 80 mol % to about 97 mol %. Triad tacticity is determined by the methods described in U.S. Patent Application Publication No. 2004/0236042.

The semi-crystalline polymer of the polymer blend may have a tacticity index m/r ranging from a lower limit of 4, or 6 to an upper limit of 10, or 20, or 25. The tacticity index, expressed herein as "m/r", is determined by $^{13}C$ nuclear magnetic resonance ("NMR"). The tacticity index m/r is calculated as defined by H. N. Cheng in 17 Macromolecules, 1950 (1984), incorporated herein by reference. The designation "m" or "r" describes the stereochemistry of pairs of contiguous propylene groups, "m" referring to meso and "r" to racemic. An m/r ratio of 1.0 generally describes an atactic polymer, and as the m/r ratio approaches zero, the polymer is increasingly more syndiotactic. The polymer is increasingly isotactic as the m/r ratio increases above 1.0 and approaches infinity.

In one or more embodiments, the semi-crystalline polymer of the polymer blend may have a density of from about 0.85 g/cm³ to about 0.92 g/cm³, or from about 0.86 g/cm³ to about 0.90 g/cm³, or from about 0.86 g/cm³ to about 0.89 g/cm³ at room temperature and determined according to ASTM D-792. As used herein, the term "room temperature" is used to refer to the temperature range of about 20° C. to about 23.5° C.

In one or more embodiments, the semi-crystalline polymer can have a weight average molecular weight (Mw) of from about 5,000 to about 500,000 g/mol, or from about 7,500 to about 300,000 g/mol, or from about 10,000 to about 200,000 g/mol, or from about 25,000 to about 175,000 g/mol.

Weight-average molecular weight, $M_w$, molecular weight distribution (MWD) or $M_w/M_n$ where $M_n$ is the number-average molecular weight, and the branching index, g'(vis), are characterized using a High Temperature Size Exclusion Chromatograph (SEC), equipped with a differential refractive index detector (DRI), an online light scattering detector (LS), and a viscometer. Experimental details not shown below, including how the detectors are calibrated, are described in: T. Sun, P. Brant, R. R. Chance, and W. W. Graessley, Macromolecules, Volume 34, Number 19, pp. 6812-6820, 2001. In one or more embodiments, the polymer blend can have a polydispersity index of from about 1.5 to about 6.

Solvent for the SEC experiment is prepared by dissolving 6 g of butylated hydroxy toluene as an antioxidant in 4 L of Aldrich reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing the dry polymer in a glass container, adding the desired amount of TCB, then heating the mixture at 160° C. with continuous agitation for about 2 hr. All quantities are measured gravimetrically. The TCB densities used to express the polymer concentration in mass/volume units are 1.463 g/mL at room temperature and 1.324 g/mL at 135° C. The injection concentration ranges from 1.0 to 2.0 mg/mL, with lower concentrations being used for higher molecular weight samples. Prior to running each sample the DRI detector and the injector are purged. Flow rate in the apparatus is then increased to 0.5 mL/min, and the DRI was allowed to stabilize for 8-9 hr before injecting the first sample. The LS laser is turned on 1 to 1.5 hr before running samples. As used herein, the term "room temperature" is used to refer to the temperature range of about 20° C. to about 23.5° C.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and dn/dc is the same as described below for the LS analysis. Units on parameters throughout this description of the SEC method are such that concentration is expressed in g/cm$^3$, molecular weight is expressed in kg/mol, and intrinsic viscosity is expressed in dL/g.

The light scattering detector used is a Wyatt Technology High Temperature mini-DAWN. The polymer molecular weight, M, at each point in the chromatogram is determined by analyzing the LS output using the Zimm model for static light scattering (M. B. Huglin, Light Scattering from Polymer Solutions, Academic Press, 1971):

$$[K_o c/\Delta R(\theta,c)] = [1/MP(\theta)] + 2A_2 c$$

where $\Delta R(\theta)$ is the measured excess Rayleigh scattering intensity at scattering angle θ, c is the polymer concentration determined from the DRI analysis, $A_2$ is the second virial coefficient, $P(\theta)$ is the form factor for a monodisperse random coil (described in the above reference), and $K_o$ is the optical constant for the system:

$$K_o = \frac{4\pi^2 n^2 \left(\frac{dn}{dc}\right)^2}{\lambda^4 N_A}$$

in which $N_A$ is the Avogadro's number, and dn/dc is the refractive index increment for the system. The refractive index, n=1.500 for TCB at 135° C. and λ=690 nm. In addition, $A_2$=0.0015 and dn/dc=0.104 for ethylene polymers, whereas $A_2$=0.0006 and dn/dc=0.104 for propylene polymers.

The molecular weight averages are usually defined by considering the discontinuous nature of the distribution in which the macromolecules exist in discrete fractions i containing $N_i$ molecules of molecular weight $M_i$. The weight-average molecular weight, $M_w$, is defined as the sum of the products of the molecular weight $M_i$ of each fraction multiplied by its weight fraction $w_i$:

$$M_w = \Sigma w_i M_i = (\Sigma N_i M_i^2 / \Sigma N_i M_i)$$

since the weight fraction $w_i$ is defined as the weight of molecules of molecular weight $M_i$ divided by the total weight of all the molecules present:

$$w_i = N_i M_i / \Sigma N_i M_i$$

The number-average molecular weight, $M_n$, is defined as the sum of the products of the molecular weight $M_i$ of each fraction multiplied by its mole fraction $x_i$:

$$M_n = \Sigma x_i M_i = \Sigma N_i M_i / \Sigma N_i$$

since the mole fraction $x_i$ is defined as $N_i$ divided by the total number of molecules:

$$x_i = N_i / \Sigma N_i.$$

In the SEC, a high temperature Viscotek Corporation viscometer is used, which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c was determined from the DRI output.

The branching index (g', also referred to as g'(vis)) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index g' is defined as:

$$g' = \frac{[\eta]_{avg}}{k M_v^\alpha}$$

where k=0.000579 and α=0.695 for ethylene polymers; k=0.0002288 and α=0.705 for propylene polymers; and k=0.00018 and α=0.7 for butene polymers.

$M_v$ is the viscosity-average molecular weight based on molecular weights determined by the LS analysis:

$$M_v = (\Sigma c_i M_i^\alpha / \rho c_i)^{1/\alpha}.$$

In one or more embodiments, the semi-crystalline polymer of the polymer blend may have a viscosity (also referred to a Brookfield viscosity or melt viscosity), measured at 190° C. and determined according to ASTM D-3236 from about 100 cP to about 500,000 cP, or from about 100 to about 100,000 cP, or from about 100 to about 50,000 cP, or from about 100 to about 25,000 cP, or from about 100 to about 15,000 cP, or from about 100 to about 10,000 cP, or from about 100 to about 5,000 cP, or from about 500 to about 15,000 cP, or from about 500 to about 10,000 cP, or from about 500 to about 5,000 cP, or from about 1,000 to about 10,000 cP, wherein 1 cP=1 mPa·sec.

The polymers that may be used in the adhesive compositions disclosed herein generally include any of the polymers according to the process disclosed in International Publication No. 2013/134038. The triad tacticity and tacticity index of a polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences.

C. Oil

In an embodiment of the present invention, the adhesive composition comprises one or more oils. The term "oil" is used herein to refer to a substance that improves the fluidity of a material, and may also be referred to as a "plasticizer" or "plasticator". Useful commercial available plasticizers include Primol™ 352, Krystol™ 550, Nyflex™ 222B, Spectrasyn 10, Spectrasyn 40, Plastol 537. Preferably, the oil as used herein does not include sunflower oil or castor oil. Primol™ 352 is a white oil available from ExxonMobil Chemical. Krystol™ 550 is a white oil available from Petro-Canada Lubricants. Nyflex™ 222B is a solvent refined naphthenic oil available from Nynas AB, located in Stockholm, Sweden. Spectrasyn 10 and Spectrasyn 40 are polyalphaolefins available from ExxonMobil Chemical. Plastol 537 is a paraffinic low-color mineral oil available from ExxonMobil Chemical. Preferably the oil is present in the invention in the amount of greater than about 2 wt % or 4 wt % or 5 wt % or 6 wt % or 7 wt % or 8 wt % or 9 wt % or 10 wt % to less than about 15 wt % or 16 wt % or 17 wt % or 18 wt % or 19 wt % or 20 wt % based on the adhesive composition.

D. Other additives

The HMA composition can include other additives, e.g., tackifiers, waxes, antioxidants, and combinations thereof either alone or in combination with one or more oils disclosed herein.

The term "tackifier" is used herein to refer to an agent that allows the polymer blend of the composition to be more adhesive by improving wetting during the application. Tackifiers may be produced from petroleum-derived hydrocarbons and monomers of feedstock including tall oil and other polyterpene or resin sources. Tackifying agents are added to give tack to the adhesive and also to modify viscosity. Tack is required in most adhesive formulations to allow for proper joining of articles prior to the HMA solidifying. As used herein, the term "tackifier" includes one or more tackifiers. Useful commercially available tackifiers are those under the trade name Escorez™, available from ExxonMobil Chemical Co. located in Baytown, Tex. Preferably, the tackifier is present in the amount of about greater than about 15 wt % or 20 wt % or 25 wt % or 35 wt % to less than about 40 wt % or 50 wt % or 55 wt % or 60 wt % based on the adhesive composition.

The term "antioxidant" is used herein to refer to high molecular weight hindered phenols and multifunctional phenols. A useful commercially available antioxidant is Irganox a hindered phenolic antioxidant available from BASF SE Corporation located in Ludwigshafen, Germany. The invention is not limited to Irganox 1010 as the antioxidant. In embodiments, other antioxidants that may be used with the polymer blends of the invention, including, but are not limited to amines, hydroquinones, phenolics, phosphites, and thioester antioxidants. Preferably, the antioxidant is present in the amount of about 0.5 to about 1 wt % based on the adhesive composition.

The term "wax" is used herein to refer to a substance that adjusts the overall viscosity of the adhesive composition. The primary function of wax is to control the set time and cohesion of the adhesive system. Adhesive compositions of the present invention may comprise paraffin (petroleum) waxes and microcrystalline waxes. In embodiments, the adhesive compositions may have no wax. In embodiments, other waxes may be used with the polymer blends of the invention including, but not limited to, Castor Oil derivatives (HCO-waxes), ethylene co-terpolymers, Fisher-Tropsch waxes, microcrystalline, paraffin, polyolefin modified, and polyolefin. A useful commercially available wax includes, but is not limited to, Polywax™ 2000 available from Baker Hughes. Preferably, the wax is present in the amount of about 5 to about 10 wt % based on the adhesive composition. In an embodiment, the adhesive composition is substantially free of a wax.

E. Applications of Polyolefin Adhesive Compositions

The adhesive formulations disclosed herein can be used in various nonwoven construction applications including, but not limited to, hygiene products such as baby diapers, adult diapers, incontinence products or devices, absorbent articles, panty liners, and sanitary napkins. The adhesive formulations disclosed herein can also be used in various nonwoven elastic applications including, but not limited to, hygiene products such as wound care dressings for human or veterinary medicine. As the hygiene industry is continuing to move to products, articles, and devices with thinner gauge films and thinner nonwoven materials, the industry is continuing to seek adhesive formulations that can be applied over a broad application temperature range, for versatility of an adhesive formulation in more than one end use product, article, device, and combinations thereof. The adhesive formulations described herein, having a high polymer load, provide a desired combination of physical properties such as stable adhesion over time indicative of broad application temperature ranges and machine coatability and therefore can be used in nonwoven applications including hygiene products disclosed herein. It should be appreciated that the adhesive formulations of the present disclosure, while being well suited for use in hygiene nonwoven products, may also find utility in other applications as well.

EXAMPLES

"Peel" or "Peel Strength" is a measure of the average force to pull apart two bonded materials, measured in grams.

Peel is tested in a T-Peel fashion on a slip/peel tester from IMASS Inc. at 12 in/min, as determined by ASTM D-903.

To apply the adhesive to the substrate, one or more polymer blends, optionally with other additives, including one or more oils, tackifiers, waxes, and antioxidants, is preheated at the application temperature until the polymer is molten. The molten material is poured into a hot melt tank and allowed to equilibrate. The pump speed is set and the add-on is calculated based on the amount of adhesive that passes through the nozzle in a given time.

In a pilot plant, propylene-ethylene copolymers are produced by reacting a feed stream of propylene with a feed stream of ethylene in the presence of a metallocene catalyst. The adhesive blends presented in the Tables below are prepared by preheating the blend of one or more oils, tackifiers, waxes, and an antioxidant to 177° C. One or more polymer blends is slowly added in a heated mantle at 177° C. to the molten liquid of oil, tackifier, wax, and antioxidant until all of the polymer has been added and is completely blended. The components are blended by manual stirring using a spatula until all polymer pellets are melted and the mixture is homogeneous. The components are stirred for an additional 10 minutes. The adhesive blend is removed from the heating mantle, and poured onto release paper. After the adhesive blend solidifies, it is cut into small pieces for testing.

The polymer blends used in the examples of the invention are listed in Table 1 and were generally produced in accordance with the method disclosed in International Publication No. 2013/134038. The invention is not limited to the polymer blends of Table 1. The comparative examples (referred to herein as Comparative or Control) are commercially available premium grades of hot melt adhesives for use by H. B. Fuller: D-3166 and HL-8128.

Table 2 shows the effect of the selection of commercial oil on the physical properties of the adhesive formulation. Specifically, Table 2 shows ten adhesive formulations (1A-3A and 5A-11A) having 50 wt % Polymer Blend A, 40 wt % tackifier, and 10 wt % oil or 70 wt % Polymer Blend B, 20 wt % tackifier, and 10 wt % oil. Formulation 4A had 10 wt % of a commercial wax in place of oil. Physical testing of the formulations were performed to determine the peel (at various times) and viscosity. Formulation 4A, having no oil, displayed unfavorably high viscosity but suitable peel values at all time intervals. Formulation 10A, having sunflower oil, and 11A, having castor oil, displayed poor aged peel values (at 1 week and older times) as compared to formulations with other types of oil, and are therefore comparative examples. Table 2 demonstrates the variety of oils that can be used to prepare adhesive formulations, providing varying degrees of viscosity reduction. It is appreciated that adhesive formulations with Comparatives D-3166 and HL8128 would also require some amount of oil in the formulation to aid in applying said adhesive.

Table 3 shows four adhesive formulations having Polymer Blend A, a commercial tackifier, and oil at various quantities. Formulation 2B having increased oil content than Formulation 1B showed improved lower viscosity values but indicated higher initial peel values. Formulation 3B indicated unfavorably higher viscosity values and lower peel values than Formulation 2B, indicating that the quantity of oil added to the formulation (even at 5 wt % increments) affects the viscosity and peel properties of the resultant formulation. Formulation 4B, having 5 wt % of Vistamaxx™6502 displayed favorably improved viscosity and peel values in comparison to Formulation 3B having the same amount of oil. Vistamaxx™6502 is a propylene-based elastomer having an ethylene content of about 13 wt % a melt mass-flow rate as measured at 230° C. and 2.16 kg of about 48 g/10 min and a density of about 0.865 g/cm$^3$, commercially available from ExxonMobil Chemical Co. The inventors have discovered that the addition of a higher molecular weight propylene-based polymer, such as Vistamaxx™6502, to the adhesive formulation in the amount of about 1 to about 10 wt % allows for a higher oil loading to the formulation without compromising peel strength of the bond.

Table 4 shows five formulations having Polymer Blend B, a commercial tackifier, and varying amounts of oil. Formulation 1C, containing no oil, had a higher viscosity and peel than formulations 2C-5C. Formulation 2C, having 10 wt % oil, showed improved viscosity but at slightly lower peel values than Formulation 1C. Formulation 3C, in comparison to Formulation 2C, indicates the ratio of polymer to oil can affect both the viscosity and peel values. A similar trend was showed in Formulation 4C as compared to 5C.

Table 5 shows six adhesive formulations having Polymer Blend A or B, a commercial tackifier, and varying amounts of oil. Overall, the initial and aged peel values for the formulations were comparable. Specifically, Table 5 indicates that increasing the amount of oil in the adhesive formulation results in a decrease in the formulation viscosity, while maintaining the peel strength. Additionally, the wax cloud point of the formulation decreased with the addition of oil.

Table 6 shows eight adhesive formulations having Polymer Blend C, D or E, a commercial tackifier, optionally wax, and 10 wt % of oil. Formulation 1E, 7E, and 8E show the effect on type of oil added on the formulation viscosity and peel values. Formulation 2E and 5E show the effect of higher polymer to oil ratio and the addition of wax. Formulation 3E and 4E show the effect of Polymer Blend E on peel performance of the resultant adhesive formulation, as compared to other formulations free of Polymer Blend E. Formulation 5E and 6E show the effect of the addition of Polymer Blend F in place of wax on improving peel performance but also increasing viscosity of the formulation.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition which persons in the pertinent art have given, as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

TABLE 1

| Polymer Blend | Viscosity at 190° C., cP | Shore Hardness C | Ethylene Content, % |
| --- | --- | --- | --- |
| Polymer Blend A | 8,000 | 19 | 12 |
| Polymer Blend B | 4,000 | 21 | 12 |

TABLE 1-continued

| Polymer Blend | Viscosity at 190° C., cP | Shore Hardness C | Ethylene Content, % |
|---|---|---|---|
| Polymer Blend C | 11,500 | 27 | 12 |
| Polymer Blend D | 8,300 | 25 | 12 |
| Polymer Blend E | 11,950 | 18 | 12 |
| Polymer Blend F | 1,355 | 63 | 6 |

TABLE 2

| | Adhesive Formulation | | | | | | | | | | |
|---|---|---|---|---|---|---|---|---|---|---|---|
| Adhesive Formulation (wt % Adhesive) | Visc. at 140° C. (mPa-s) | Initial Peel (g) | 1 hr Peel (g) | 24 hr Peel (g) | 1 week Peel (g) | 2 week Peel (g) | 3 week Peel (g) | 4 week Peel (g) | 3 month Peel (g) | 6 month Peel (g) | Aged 14 days at 50° C. |
| 1A 70 wt % Polymer Blend B/ 20 wt % Escorez ™ 5400/ 10 wt % Primol 352 | 6,520 | 77 | 61 | 75 | 58 | 61 | 75 | 80 | | 67 | 63 |
| 2A 70 wt % Polymer Blend B/ 20 wt % Escorez ™ 5400/ 10 wt % Nyflex222b | 9,040 | 90 | 94 | 73 | 81 | 84 | 90 | 102 | | 73 | 97 |
| 3A 70 wt % Polymer Blend B/ 20 wt % Escorez ™ 5400/ 10 wt % Plastol 537 | 7,217 | 96 | 88 | 83 | 68.5 | 69 | 76 | 81 | | | 49 |
| 4A 70 wt % Polymer Blend B/ 20 wt % Escorez ™ 5400/ 10 wt % Polywax 2000 | 8,625 | 181 | 208 | 188 | 182 | 156 | 179 | 153 | 144 | 106 | 142 |
| 5A 50 wt % Polymer Blend A/ 40 wt % Escorez ™ 5400/ 10 wt % Krystol 550 | 6,969 | 93 | 111 | 108 | 97.5 | 117 | 110 | 99 | 97 | | 92 |
| 6A 50 wt % Polymer Blend A/ 40 wt % Escorez ™ 5400/ 10 wt % Primol 352 | 6,840 | 103 | 91 | 96 | 89 | 76 | 59 | 84 | | 36 | 58 |
| 7A 50 wt % Polymer Blend A/ 40 wt % Escorez ™ 5400/ 10 wt % Nyflex 222b | 7,398 | 126 | 110 | 109 | 61 | 68 | 51 | 70 | | 25 | 53 |
| 8A 50 wt % Polymer Blend A/ 40 wt % Escorez ™ 5400/ 10 wt % Plastol 537 | 7,100 | 107 | 107 | 104 | 86.5 | 61 | 72 | 93 | | | 52 |
| 9A 50 wt % Polymer Blend A/ 40 wt % Escorez ™ 5400/ 10 wt % Spectrasyn 40 | 7,890 | 115 | 115 | 124 | 112 | 111 | 104 | 108 | 89 | 77 | 86 |
| 10A 50 wt % Polymer Blend A/ 40 wt % Escorez ™ 5400/ 10 wt % Sunflower oil | 6,460 | 84 | 70 | 41 | 22 | 25 | 22 | 20 | | 9 | 10 |
| 11A 50 wt % Polymer Blend A/ 40 wt % Escorez ™ 5400/ 10 wt % Castor oil | 7,200 | 88 | 58 | 44 | 29 | 23 | 23 | 24 | | | 39 |
| Control - D-3166 | 6,325 | 106 | 102 | 137 | 124 | 111 | 139 | 131 | | 67.5 | 73 |
| Control - HL8128 | 5,700 | 95 | 99 | 89 | 91 | 92 | 93 | 99 | 122 | 126 | 150 |

TABLE 3

| | Adhesive Formulation | | | |
|---|---|---|---|---|
| Adhesive Formulation (wt % Adhesive) | Viscosity at 140° C. (mPa-s) | 24 hr Peel (g) | 2 week Peel (g) | Aged 2 weeks at 50° C. Peel (g) |
| 1B 50 wt % Polymer Blend A/ 40 wt % Escorez ™ 5400/ 10 wt % Kaydol 550 | 10,490 | 112 | 92 | 62 |
| 2B 47.2 wt % Polymer Blend A/ 37.8 wt % Escorez ™ 5400/ 15 wt % Kaydol 550 | 8,760 | 87 | 106 | 63 |
| 3B 44 wt % Polymer Blend A/ 36 wt % Escorez ™ 5400/ 20 wt % Kaydol 550 | 8,900 | 63 | 75 | 70 |
| 4B 39.5 wt % Polymer Blend A/ 5 wt % Vistamaxx ™ 6502 35.5 wt % Escorez ™ 5400/ 20 wt % Kaydol 550 | 7,550 | 99 | 88 | 73 |

TABLE 4

| Adhesive Formulation (wt % Adhesive) | Viscosity at 140° C. (mPa-s) | 24 hr Peel (g) | 2 week Peel (g) | Aged 2 weeks at 50° C. Peel (g) |
|---|---|---|---|---|
| 1C 70 wt % Polymer Blend B/ 30 wt % Escorez ™ 5400 | 10,390 | 118 | 117 | 102 |
| 2C 70 wt % Polymer Blend B/ 20 wt % Escorez ™ 5400/ 10 wt % Kaydol 550 | 9,788 | 86 | 98 | 89 |
| 3C 63 wt % Polymer Blend B/ 27 wt % Escorez ™ 5400/ 10 wt % Kaydol 550 | 5,762 | 88 | 93 | 83 |
| 4C 47.5 wt % Polymer Blend B/ 47.5 wt % Escorez ™ 5400/ 5 wt % Kaydol 550 | 9,380 | 93 | 46 | 70 |
| 5C 57 wt % Polymer Blend B/ 38 wt % Escorez ™ 5400/ 5 wt % Kaydol 550 | 9,140 | 102 | 94 | 83 |

TABLE 5

| Adhesive Formulation (wt % Adhesive) | Viscosity at 140° C. (mPa-s) | 24 hr Peel (g) | 2 week Peel (g) | 4 week Peel (g) | 3 month Peel (g) | Wax Cloud Point (° C.) | Aged 2 weeks at 50° C. Peel (g) |
|---|---|---|---|---|---|---|---|
| 1D 70 wt % Polymer Blend B/ 30 wt % Escorez ™ 5400 | 10,490 | 117 | 68 | 113 | 93 | 116 | 96 |
| 2D 70 wt % Polymer Blend B/ 20 wt % Escorez ™ 5400/ 10 wt % Kaydol 550 | 9,180 | 112 | 105 | 90 | 87 | <65 | 101 |
| 3D 67 wt % Polymer Blend A/ 29 wt % Escorez ™ 5400/ 4 wt % Kaydol 550 | 8,080 | 101 | 92 | 104 | 84 | <65 | 94 |
| 4D 66 wt % Polymer Blend A/ 28 wt % Escorez ™ 5400/ 6 wt % Kaydol 550 | 7,363 | 108 | 110 | 113 | 95 | <65 | 97 |
| 5D 65 wt % Polymer Blend A/ 28 wt % Escorez ™ 5400/ 8 wt % Kaydol 550 | 6,460 | 93 | 102 | 106 | 89 | 78 | 91 |
| 6D 63 wt % Polymer Blend A/ 27 wt % Escorez ™ 5400/ 10 wt % Kaydol 550 | 5,762 | 88 | 93 | 100 | 82 | <65 | 83 |

TABLE 6

| Adhesive Formulation (wt % Adhesive) | Viscosity at 160° C. (mPa-s) | Viscosity at 175° C. (mPa-s) | Initial Peel (g) |
|---|---|---|---|
| 1E 50 wt % Polymer Blend C/ 40 wt % Escorez ™5400/ 10 wt % Primol 352/ 0.5 wt % Irganox 1010 | 4,835 | 3,100 | 111 |
| 2E 50 wt % Polymer Blend D/ 40 wt % Escorez ™5400/ 10 wt % Primol 352/ 0.5 wt % Irganox 1010 | 3,510 | 2,283 | 73 |
| 3E 50 wt % Polymer Blend E/ 40 wt % Escorez ™5400/ 10 wt % Primol 352/ 0.5 wt % Irganox 1010 | 4,580 | 2,960 | 41 |
| 4E 45 wt % Polymer Blend E/ 40 wt % Escorez ™5400/ 5 wt % Polywax 2000/ 10 wt % Primol 352/ 0.5 wt % Irganox 1010 | 3,195 | 2,085 | 52 |
| 5E 45 wt % Polymer Blend D/ 40 wt % Escorez ™5400/ 5 wt % Polywax 2000/ 10 wt % Primol 352/ 0.5 wt % Irganox 1010 | 2,410 | 1,585 | 67 |
| 6E 45 wt % Polymer Blend D/ 10 wt % Polymer Blend F/ 37 wt % Escorez ™5400/ 8 wt % Primol 352/ 0.5 wt % Irganox 1010 | 3,590 | 2,335 | 122 |
| 7E 50 wt % Polymer Blend C/ 40 wt % Escorez ™5400/ 10 wt % Nyflex 222b/ 0.5 wt % Irganox 1010 | 5,080 | 3,245 | 127 |
| 8E 50 wt % Polymer Blend C/ 40 wt % Escorez ™5400/ 10 wt % Spectrasyn 10/ 0.5 wt % Irganox 1010 | 4,725 | 3,045 | 115 |

We claim:

1. An adhesive composition comprising:
(a) about 30 wt % to about 80 wt % of a polymer blend, based on the total weight of the adhesive composition comprising:
a first propylene-based polymer, wherein the first propylene-based polymer is a semi-crystalline copolymer of propylene and ethylene, and wherein the first propylene-based polymer has an ethylene content in the range of about 10 wt % to about 20 wt % based on the weight of the first propylene-based polymer; and a second propylene-based polymer, wherein the second propylene-based polymer is a copolymer of propylene and ethylene, and wherein the second propylene-based polymer has an ethylene content in the range of about 2 wt % to about 10 wt % based on the weight of the second propylene-based polymer, wherein the second propylene-based polymer is different than the first propylene-based polymer, and wherein the polymer blend has a melt viscosity, measured at 190° C. of about 1,000 to about 30,000 cP;

(b) about 1 to about 10 wt % of a propylene-based elastomer having an ethylene content of about 13 wt % a melt mass-flow rate as measured at 230° C. and 2.16 kg of about 48 g/10 min and a density of about 0.865 g/cm$^3$; and (c) about 2 wt % to about 15 wt % of an oil selected from at least one of a white oil, naphthenic oil, polyalphaolefin, mineral oil, and combinations thereof, based on the total weight of the adhesive composition.

2. The adhesive composition of claim 1, wherein the composition is substantially free of a wax.

3. The adhesive composition of claim 1, further comprising a wax, wherein the wax is present in the amount of about 5 wt % to about 10 wt % of the adhesive composition.

4. The adhesive composition of claim 1, further comprising an antioxidant.

5. The adhesive composition of claim 1, further comprising a tackifier, where in the tackifier is present in the amount of about 15 wt % to about 60 wt % of the adhesive composition.

6. The adhesive composition of claim 1, wherein the composition substantially free of sunflower oil or castor oil.

7. An article comprising the adhesive composition of claim 1, wherein the adhesive composition adheres one or more substrates, and wherein at least one of the one or more substrates comprises paper, cardboard, plastic, nonwoven, metal, wood, other natural fiber based material, or combinations thereof.

8. A process to prepare an adhesive composition, comprising combining:

(a) about 30 wt % to about 80 wt % of a polymer blend, based on the total weight of the adhesive composition, comprising a first propylene-based polymer, wherein the first propylene-based polymer is a semi-crystalline copolymer of propylene and, and wherein the first propylene-based polymer has an ethylene content in the range of about 10 wt % to about 20 wt % based on the weight of the first propylene-based polymer; and a second propylene-based polymer, wherein the second propylene-based polymer is a copolymer of propylene and ethylene, and wherein the second propylene-based polymer has an ethylene content in the range of about 2 wt % to about 10 wt % based on the weight of the second propylene-based polymer, wherein the second propylene-based polymer is different than the first propylene-based polymer, and wherein the polymer blend has a melt viscosity, measured at 190° C. of about 1,000 to about 30,000 cP;

(b) about 1 to about 10 wt % of a propylene-based elastomer having an ethylene content of about 13 wt % a melt mass-flow rate as measured at 230° C. and 2.16 kg of about 48 g/10 min and a density of about 0.865 g/cm$^3$; and (c) about 2 wt % to about 15 wt % of an oil selected from at least one of a white oil, naphthenic oil, polyalphaolefin, mineral oil, and combinations thereof, based on the total weight of the adhesive composition.

9. The process of claim 8, wherein the adhesive composition substantially free of sunflower oil or castor oil.

* * * * *